United States Patent Office 3,252,787
Patented May 24, 1966

3,252,787
PROCESS FOR PRODUCING TITANIUM DIOXIDE CONCENTRATE AND OTHER USEFUL PRODUCTS FROM ILMENITE AND SIMILAR ORES
Chyn Duog Shiah, Manhasset, N.Y., assignor to Oceanic Process Corporation, New York, N.Y., a corporation of New York
No Drawing. Filed June 11, 1963, Ser. No. 286,910
6 Claims. (Cl. 75—1)

This invention relates to a process for the economical utilization of titaniferrous ores, particularly, ilmenite. More particularly, it relates to the production of high quality titanium dioxide concentrate of above 85% purity which can then be used as raw material for the manufacture of $TiO_2$ pigments and titanium chlorides and titanium metal, via titanium tetrachloride, and replaces and/or supplements the high cost and scarce naturally-occurring rutile, and simultaneously produces high-quality metallic iron powder or iron oxide.

The titanium dioxide industry is growing at a very rapid rate. For example, it is estimated that the demand in the United States for titanium dioxide will reach about 750,000 tons by 1965 and that the worldwide demand by 1965 will be about 1,100,000 tons. Titanium metal has found increasing use in space technology and chemical plant construction. The preferred raw material for the titanium industry is rutile, which contains more than 90% titanium dioxide ($TiO_2$). Another raw material for the production of titanium dioxide is ilmenite, an ore having the composition $FeTiO_3$, and, in view of the current level of rutile mining capacity, limited availability and high cost, there is a strong demand for effective methods for the benefication of ilmenite, which is cheap, and abundant, to form a titanium dioxide concentrate comparable to rutile.

In the past, many processes for the upgrading of ilmenite have been proposed and examined, but only the process which takes advantage of cheap hydroelectric power to electrothermally smelt ilmenite with carbon, and produces a pig iron as a co-product and a slag containing about 70% $TiO_2$, has been put into commercial practice. Another producer, taking advantage of cheap hydrochloric acid, has for a period of two years produced a 90%+ $TiO_2$ concentrate by hydrochloric acid leaching. However, this operation has been forced to shut down because the problem of disposing of large quantities of corrosive iron chloride solutions was not solved.

Magri et al. (U.S. Patent 2,721,793, October 25, 1955) describes a process of reducing selectively the iron oxide component of ilmenite in the presence of certain boron compounds. British Patent 754,453, August 8, 1956, discloses a process which uses soda, salt and the like as slag-forming material and reduces the ore with a solid carbonaceous material without sintering. Neither of these processes, however, effect complete reduction of iron oxides to metallic iron and the separation of metallic iron from the reduced ore is also incomplete.

Wainer (U.S. Patent 2,914,381, November 24, 1959) shows a process which uses hydrochloric acid digestion but makes no mention of the recovery of hydrochloric acid and/or disposal and treatment of the iron chloride by-products. The recovery of $TiO_2$ from the ore is only about 60%. Melvin Chen Siang Chang (U.S. Patent 2,912,320, November 10, 1959) discloses a process which uses nitric acid for leaching, either at high temperatures or under elevated pressures, and the nitric acid is regenerated and reused. This process has practical disadvantages. Leddy (U.S. Patent 3,060,002, October 23, 1962) recommends using oxygen-containing gases to pretreat the ilmenite ore prior to pressure digestion by hydrochloric acid. This process presents the problem of recovery of hydrochloric acid and/or disposal of iron chlorides.

It is apparent therefore, that prior proposals for utilizing ilmenite have suffered from one or more disadvantages and the demand for an effective, economical process still exists.

It is, accordingly, an object of the present invention to provide a process for the economical and efficient production of titanium dioxide from ores containing it which avoids the drawbacks and disadvantages of processes heretofore proposed.

In accordance with the present invention, this and other objects are attained by the provision of a process which is effective for converting ilmenite or similar ore into a $TiO_2$ concentrate, which can be conveniently called "synthetic rutile," and producing high purity iron powder and/or iron oxide as co-product.

The process of this invention comprises the steps of pre-oxidizing the ore by roasting it in the presence of air or other oxygen-containing gas at 750–1200° C. for 20–150 minutes, to convert the iron in the ore to the ferric state, reducing the ferric iron to metallic iron by a gaseous or solid reducing agent at 750–1250° C. for about 20–140 minutes, and leaching the metallic iron from the reduction product by means of a ferric salt solution, and regenerating the ferric salt solution.

By means of the process of this invention, the recovery of $TiO_2$ and iron from the ore are both over 90%. The purity of the "synthetic rutile" produced is 90% $TiO_2$ or more. The purity of metallic iron and/or iron oxide is above 99%. Only fuel and energy are consumed. The consumption of chemical reagents is negligible from a practical standpoint. The process of the invention can be carried out in conventional apparatus well-known in the chemical and metallurgical industries, and no special apparatus is needed.

As mentioned above, the selective reduction of the iron oxide components of ilmenite has been heretofore proposed but even under the severe conditions of an electric furnace, the reduction has never been complete. It is known that the iron in ilmenite exists in two valence states, i.e., ferric and ferrous. As such, it cannot be reduced completely to metallic iron in one step. However if, in accordance with my invention the ore is first pre-oxidized by roasting it in the presence of air or other oxygen-containing gases at 750–1200° C. for a period of 20–150 minutes, all the iron will be converted to the ferric state. Once all the iron exists in the ferric state, I have found that the reduction by carbon, carbon monoxide, hydrogen or other reducing agents, alone or in combination, can be speedily carried to completion. I have used with advantage a mixture of carbon monoxide and hydrogen from the steam reforming of natural gas or naphtha, or by partial oxidation of fuel oils. Substantially, 100% reduction is achieved at 750–1250° C. in about 20–140 minutes.

The metallic iron thus produced is however, intimately interwoven with the $TiO_2$ particles. Attempts to segregate this product physically, e.g. by electro-magnet separation, or chemically by means of additives to alter the particle growth of iron crystals, have ended in failure. Acid leaching results in the same difficulties that were encountered in the acid leaching of the original ore. However, in accordance with my invention, instead of separating the metallic iron by physical means or by acid leaching, I leach the metallic iron-$TiO_2$ product with a solution of $FeCl_3$ or other ferric salt, such as ferric sulfate, or the like, according to the following reaction:

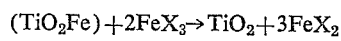

wherein X represents $Cl^-$, $SO_4^=$, or other anion or acid radical.

Indeed, this reaction is used as the basis for the quantitative determination of metallic iron. The reactions go to completion rapidly. The separation of solid $TiO_2$ and liquid ferrous chloride solution is a simple matter. The The $FeCl_3$ solution is most conveniently an aqueous solution but, instead of an aqueous solution, an alcoholic or other non-aqueous solution of ferric chloride can be advantageously used. The concentration of the solution is not critical but, from a practical standpoint, a concentration of at least 12% of ferric salt is advantageously used. Sufficient solution is used to provide at least the stoichiometric quantity of ferric salt, e.g. $FeCl_3$, for the reaction, and excess quantities can be employed if desired. Impurities such as $SiO_2$ and $Al_2O_3$ will not react with the ferric salt solution. Manganese, if present, would exist in the form of MnO, after the pre-oxidation and reduction steps, and could be transformed into $MnCl_2$, or other manganous salts.

The $FeCl_2$ or other ferrous salt solution, possibly containing small amounts of $MnCl_2$, or other manganese salt, is further processed by the following treatment operation, accomplishing the important object of complete recovery of ferric chloride, or other ferric salt, which is used over and over again for the leaching step.

In this treatment operation, the $FeCl_2$ or other ferrous salt solution is reacted with oxygen or an oxygen-containing gas, with or without the addition of a catalyst such as ozone. The following reaction occurs:

$$12FeX_2 + 3O_2 \rightarrow 8FeX_3 + 2Fe_2O_3$$

$MnX_2$ under identical conditions will not react. Thus, the $Fe_2O_3$ is exceedingly pure. To avoid accumulation of impurities in the $FeX_3$ leaching solution, a small portion of the recycle liquor, e.g. up to 5%, is rejected and replenished by fresh $FeX_3$. Such makeup represents the only chemical consumption of the process.

In the regeneration operation, not all of the ferrous iron need be converted to ferric iron so that the regenerated solution contains both ferric iron and ferrous iron, e.g. in the proportions of about 1.5 to 1. This solution is just as effective as a solution containing only ferric iron, such as the original solution fed to the system, but it will be understood that the amount of solution used is that required to provide sufficient ferric iron for the leaching reaction.

The invention will now be further described by reference to the following specific examples of practical application, it being understood that these examples are merely illustrative, and are not to be taken as limitative of the invention. In the examples, there was used an ilmenite ore having the following typical analysis:

| | Percent |
|---|---|
| $TiO_2$ | 55 |
| $Fe_2O_3$ | 17.83 |
| FeO | 23.39 |
| MnO | 1.59 |
| Acid insolubles | 2.19 |

One hundred grams of the above ore, in its original particles sizes, was roasted in a muffle furnace for two hours at 1050° C. After roasting it was found that over 99% of the total iron existed as ferric oxide.

The roasted ore was then subjected to reduction in an electric tube furnace with hydrogen gas for two hours at a temperature of 900° C. In order to prevent re-oxidation, cooling was effected in an inert gas atmosphere. Analysis of the reduced ore showed that substantially all of the contained iron was in metallic form.

The thus reduced ilmenite was stirred into 1.5 liters of a regenerated ferric chloride leaching liquor with the following composition:

| | G./l. |
|---|---|
| Total iron | 120 |
| Ferrous iron | 70 |
| Ferric iron | 50 |

Liquor temperature was maintained at around 80° C. and intimate mixing was affected by means of a stirrer.

After one hour, the liquor and residue were separated by decantation. Analysis of the leach liquor showed the following approximate composition:

| | G./l. |
|---|---|
| Total iron | 140 |
| Ferrous iron | 130 |
| Ferric iron | 10 |

The leached residue was washed first with a little acidified water and then with water. It was then dried and there was thus obtained a beneficiated ilmenite product.

The total product thus obtained from the original 100 grams of ilmenite was about 60 grams. Its analysis was as follows:

| | Percent |
|---|---|
| TiO | 91 |
| Total iron | 1.2 |

The particle size distribution of the product was essentially the same as that of the original ilmenite.

When the foregoing operation is repeated using a ferric sulfate solution, the same results are obtained and the anion is not of significance.

For the regeneration of the leached liquor, the above-described method was employed and gave entirely satisfactory results:

*Oxidation by air*

Air was bubbled through the leach liquor maintained at a temperature of about 80° C. A reflux condenser was provided to prevent loss of water. About half an hour after the air was first introduced, the color of the liquor changed from a greenish tint to brown. As oxidation progressed further, fine yellow precipitates of hydrated iron oxide gradually settled out.

When the liquor had attained its original proportion of ferric and ferrous iron, air introduction was stopped and the precipitates were filtered off.

The regenerated liquor was used over again for the leaching of reduced ilmenite, while the precipitates were washed, filtered and calcined into ferric oxide of high purity.

From 1.5 liters of the leached liquor, about 40 grams of finished iron oxide was recovered, which analyzed 99% purity.

It will be understood that various changes and modifications may be made without departing from the invention as defined in the appended claims and it is intended, therefore, that all matter contained in the foregoing description shall be interpreted as illustrative only and not as limitative of the invention.

I claim:

1. A process for refining titaniferous ores containing ferrous oxide which comprises the steps of roasting the ore in an oxidizing atmosphere until substantially all of the ferrous oxide is converted to ferric oxide, reducing the roasted ore with a reducing agent until substantially all of the ferric oxide is converted to metallic iron, leaching the resulting product with a solution of a ferric salt, regenerating the ferric salt solution by oxidation with a member of the group consisting of oxygen and oxygen-containing gases at a temperature substantially above ambient temperature and reusing the regenerated ferric salt solution in said leaching step.

2. A process according to claim 1, in which said ferric salt solution is an aqueous solution of ferric chloride.

3. A process according to claim 2, in which said regenerating step is carried out substantially in accordance with the formula:

$$12FeCl_2 + 3O_2 \rightarrow 8FeCl_3 + 2Fe_2O_3$$

4. A process according to claim 1, in which said reducing agent is selected from the group consisting of hydrogen and carbon monoxide.

5. A process according to claim 4, in which the reducing step is carried out by heating said roasted ore with said reducing agent at a temperature in the range of 750° C. to 1250° C. for a period of 20 to 140 minutes.

6. A process according to claim 1, in which said roasting step is carried out by heating said ore in an oxidizing atmosphere at a temperature in the range of 750° C. to 1200° C. for a period of 20 to 150 minutes.

References Cited by the Examiner

UNITED STATES PATENTS

| 125,464 | 4/1872 | Larkin | 75—121 |
|---|---|---|---|
| 1,275,374 | 8/1918 | Bradley | 75—114 |
| 1,542,350 | 6/1925 | Whittemore | 23—202 |
| 2,045,092 | 6/1936 | Mitchell | 75—111 |
| 2,290,843 | 7/1942 | Kinney | 75—21 |
| 2,445,648 | 7/1948 | Truesdale | 75—34 |
| 2,775,517 | 12/1956 | Mancke | 75—1 |
| 2,818,328 | 12/1957 | Francis | 75—.55 |
| 2,852,452 | 9/1958 | Cunningham | 204—113 |
| 2,903,341 | 9/1959 | Pike | 23—202 |
| 2,961,298 | 11/1960 | Haakon | 23—202 |
| 3,105,755 | 10/1963 | Green | 75—1 |

OTHER REFERENCES

Hackh's Chemical Dictionary, Third Edition, 1944, The Blakiston Company, Philadelphia, page 508.

DAVID L. RECK, *Primary Examiner.*

BENJAMIN HENKIN, *Examiner.*